Figure 1:
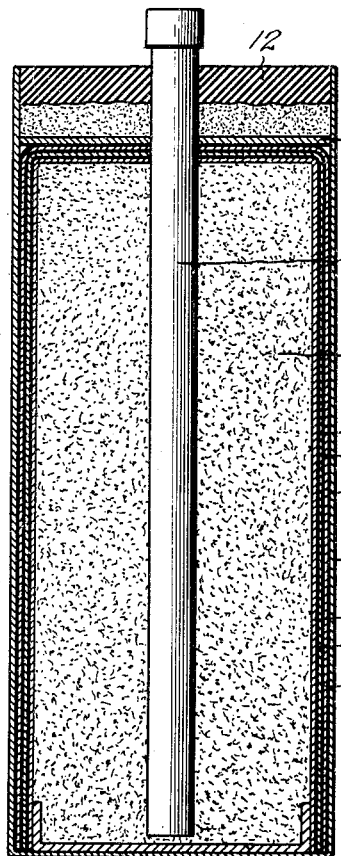

Aug. 30, 1927.

C. P. DEIBEL ET AL 1,640,488

DRY CELL AND LINING FOR SAME

Filed Nov. 19, 1926

Inventors
C. P. Deibel
W. G. Waitt
By Hull Brock & West
Attorneys

Patented Aug. 30, 1927.

1,640,488

UNITED STATES PATENT OFFICE.

CYRIL P. DEIBEL AND WALTER G. WAITT, OF LAKEWOOD, OHIO, ASSIGNORS TO GENERAL DRY BATTERIES, INCORPORATED, OF CLEVELAND, OHIO, A CORPORATION OF OHIO.

DRY CELL AND LINING FOR SAME.

Application filed November 19, 1926. Serial No. 149,299.

This invention relates to improvements in the construction of dry cells and it is applicable to cells of practically all sizes, embracing those ranging from the smaller flashlight sizes to the standard six inch size.

The main object of the invention is to provide a better electrolytic solution contact between the electrolytic mix and the zinc anode in dry cells.

In the manufacture of dry cells according to methods heretofore known, this result has only been partially accomplished by the use of a single sheet of thick absorbent pulpboard or two or more layers of thin absorbent paper having a layer or coating of paste on that side of the paper which is adjacent to the surface of the zinc anode, which in most cases is a cylindrical zinc can.

We have found that by using two or more layers of the thin paper with a coating of paste between the layers and also between the paper and the zinc can that much better results and a more efficient cell is obtained.

If two or more layers of moistened paper are placed together, there will not be perfect contact between the surfaces. The bubbles of air and wrinkles and non-uniform surfaces will prevent this. Furthermore, under a magnifying glass, the surface of the paper is found to consist of a mass of fibers and only the high spots of these surfaces make contact with the fibers of adjacent sheets. However, if a layer of paste is used between adjacent surfaces of the paper the moist paste makes complete contact between all of the surfaces of adjacent layers of paper. Furthermore, as the dry cell is used the paper lining becomes dryer and the additional moist paste between the layers decreases the tendency of the paper to dry out and consequently increases the service life of the cell because it helps to maintain the necessary moisture for the electrolytic medium or path for the passage of electricity and also acts as a reservoir for the products of internal chemical action. Furthermore, when cells having the paste between the adjacent layers of paper are tested, it is found that zinc cans are much more uniformly consumed or eaten away by the internal chemical action, resulting in much longer service life before the decomposition or eating through of the zinc electrode. The paste may be applied to the paper in any suitable manner as by brushing or spraying or passing the paper over a roller which is dipping into paste on one side. The paste may be dried on the lining material either before or after the lining is inserted into the zinc can and the paste may or may not contain electrolytic salts before being placed in the battery.

In the usual six inch dry cell, it has been customary to use a single sheet of pulpboard for the side lining of the zinc can and one or more pulpboard or cardboard washers as a lining for the bottom of the can.

Our construction is particularly well adapted for use with the six inch cell and we use two or more layers of thin tough absorbent paper for lining the side of the can. This paper is coated with paste on one side of each sheet and is placed in the can with the coated side of each sheet outermost thereby providing a layer of paste between the zinc can and the outer layer of paper and between each layer of paper when two or more layers are used. We may use the pasted paper in one continuous strip but according to the preferred embodiment of our invention we use several sheets of paper, preferably three as shown in the drawing, and place the sheets within the can with their ends overlapping as shown in the drawings. If one continuous sheet is used instead of three separate sheets, it has been found that unless the paper is wrapped very tightly so as to make a very tight fit to the side of the can, the lining will be torn or split when the usual depolarizing mix is inserted in the can and further packed or tamped to compress the same, as the loosely coiled paper cannot uncoil or slip sufficiently to make a tight fit within the can. If separate sheets of paper are used as shown in the drawing, each ply or sheet can uncoil or slip without being restricted by adjacent layers and a comparatively loose lining will spread tightly to the surface of the can without splitting. If the paper splits, the cell is internally short circuited and made worthless by the depolarizing mix passing through the split and coming in contact with the zinc electrode. The preference for separate sheets is particularly desirable for the larger sizes or six inch size dry cell which is two and one-half inches in diameter and six inches high. For smaller cells such as the one and one-fourth inches diameter by two and one-fourth inches in height, such as are standard for flash light and radio batteries, a continuous strip of paper may be safely used, provided it is wrapped so as to tightly fit the can, and is better adapted for lining the zinc cans by automatic machinery. In the standard six inch cell the bottom lining may be applied by any of the usual methods used in dry cell manufacture as, for instance, one or more paper or pulpboard disks or caps, which may or may not be impregnated with wax or other waterproofing material.

Figure 4:
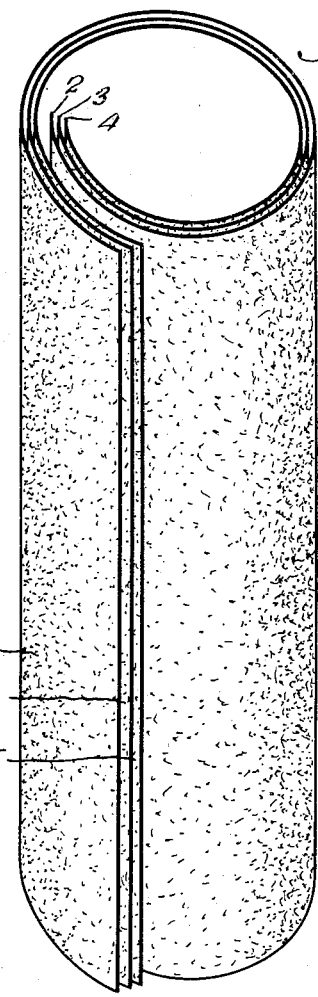
Figure 3:
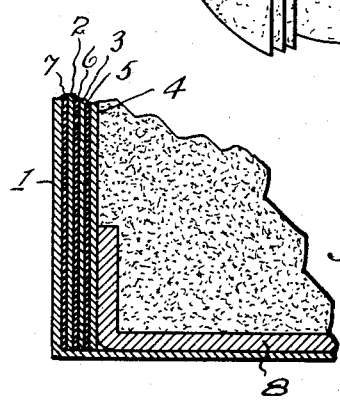
Figure 2:
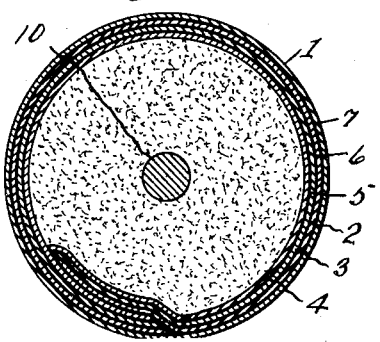

In the accompanying drawing forming a part of this specification, Fig. 1 is a somewhat exaggerated vertical sectional view of a standard six-inch cell constructed in accordance with our invention; Fig. 2 is a horizontal sectional view of the same with the lining and paste exaggerated; Fig. 3 is an enlarged fragmentary vertical sectional view of the cell and Fig. 4 is a perspective view showing the three sheets of lining as they will appear just prior to being inserted into the can.

Referring now to the drawing the numeral 1 designates the usual zinc can having a lining comprising three separate sheets of thin unsized kraft paper and designated by the numerals 2, 3 and 4. Each sheet of paper is coated on one side with a layer of paste, the paste being shown in heavy black lines in Figs. 1 and 2 and designated 5, 6 and 7. The three sheets of lining are rolled up together as shown in Fig. 4 and inserted into the can. A cardboard or pasteboard washer 8 is next inserted to form a lining for the bottom of the can. A suitable quantity of depolarizing mix 9 together with a carbon electrode 10 is next tightly packed into the lined can by either tamping or pressing. Sufficient electrolytic solution is then added to thoroughly moisten the lining, paste and depolarizing mix. The upper ends of the three sheets of lining are then bent over the top of the mix as shown in Fig. 1 and a washer 11 is inserted and pressed down over the same. A layer of grannular material, preferably sand, is then poured into the cell and the upper end of the cell is sealed by a suitable seal 12 of pitch or wax.

Attention is called to the fact that each sheet of lining is coated with paste on one side so that when the lining is placed in the cell there will be a layer of paste between the can and the outer layer of lining and between each layer of lining. When the mix is tamped in the cell, each ply or sheet of lining will uncoil or slip without being restricted by adjacent layers and the comparatively loose lining will spread tightly over the surface of the can without splitting. In other words, the lining being composed of several separate sheets, the same will be allowed to slip relative to each other and assume the position shown in Fig. 2. In some cases, it may be desirable to use only two sheets of lining and in the other cases it may be found desirable to use four or more. We therefore do not wish our invention to be limited to any particlar number of sheets of lining. It also may be found desirable to make the lining of sufficient length to allow the lower end of the same to be folded over to form a lining for the bottom of the can as well, in which case the disk or washer 8 will not be necessary. Various other changes may be made without departing from the spirit of our invention and we therefore wish our invention to be limited only in accordance with the scope of the appended claims.

While we have described the use of paper as a lining coated on one side, a similar result will be obtained by the use of separate layers of paper which are coated on both sides. It also may be found desirable to use cloth or similar woven material which has been coated with suitable paste either on one side or on both sides.

It will now be clear that we have provided an improvement in the construction of dry cells which accomplishes the objects of the invention as hereinbefore stated.

Having thus described our invention, what we claim is:—

1. A dry cell of the character described comprising a cup, a lining for said cup comprising a plurality of sheets of paper disposed within said cup with their ends overlapping, the outer sides of said sheets of paper being coated with paste, whereby a layer of paste is provided between the cup and the outer sheet of paper and between the individual sheets of paper, a washer covering the bottom of the cup, a quantity of depolarizing mix containing an electrode compressed within the lined cup, said quantity of mix and lining being permeated with an electrolytic solution, and means for sealing the cup.

2. A lining for dry cells comprising two or more sheets of paste coated absorbent material, said sheets of lining being arranged within a cup with their ends overlapping whereby said individual sheets may slip with respect to each other when a quantity of mix is compressed within the lined cell.

3. A lining for dry cells comprising two or more sheets of absorbent material having a coating of paste on each side thereof, said sheets being arranged within a cup with their ends overlapping whereby said individual sheets may slip with respect to each other when a quantity of mix is compressed within the lined cell.

4. A lining for dry cells comprising two or more sheets of thin tough absorbent material having a coating of paste on each sheet, said sheets being arranged within a container with their ends overlapping whereby said individual sheets may slip with respect to each other when a quantity of mix is inserted within the lined cell.

5. A dry cell of the character described comprising a cup, a lining applied to the active surface of the cup and comprising two or more separate sheets of thin tough paste coated absorbent material arranged within the cup with their ends overlapping, a quantity of depolarizing mix compressed within the lined cup and containing an electrode, said mix and lining being permeated with electrolytic solution and means sealing the upper end of the cell.

6. A lining for dry cells comprising two or more separate sheets of thin tough absorbent paper, said sheets of lining carrying a quantity of paste and being arranged within a cup with their ends overlapping whereby the individual sheets may slip with respect to each other when a quantity of mix is projected into the lined cell.

7. A lining for dry cells comprising a plurality of sheets of thin tough absorbent material, said sheets being arranged within a container with their ends overlapping whereby the individual sheets may slip with respect to each other when a quantity of mix is projected into the lined cell.

8. A dry cell of the character described comprising a container, a lining for said container comprising a plurality of sheets of thin tough absorbent material disposed within said container with their ends overlapping, a quantity of depolarizing mix arranged within the lined container and means sealing the top of said container.

9. A dry cell as set forth in claim 7 in which one or more of said sheets has a coating of paste thereon.

In testimony whereof, we hereunto affix our signatures.

CYRIL P. DEIBEL.
WALTER G. WAITT.